US00RE37132E

(19) United States
(12) Reissued Patent
Douglas et al.

(10) Patent Number: US RE37,132 E
(45) Date of Reissued Patent: Apr. 10, 2001

(54) ENERGY ABSORBING EXERCISING AND TRAINING MACHINE

(75) Inventors: D. Scott Douglas, P.O. Box 1669, Clearwater, FL (US) 34617; John D. Webb, Clearwater, FL (US)

(73) Assignee: D. Scott Douglas, Palm Harbor, FL (US)

(21) Appl. No.: 08/770,686

(22) Filed: Dec. 17, 1996

Related U.S. Patent Documents

Reissue of:
(64) Patent No.: 5,050,871
Issued: Sep. 24, 1991
Appl. No.: 07/607,641
Filed: Oct. 25, 1990

U.S. Applications:

(63) Continuation of application No. 08/126,301, filed on Sep. 23, 1993, now abandoned, which is a continuation of application No. 07/388,116, filed on Aug. 1, 1989, now abandoned.

(51) Int. Cl.[7] ..... A63B 21/00
(52) U.S. Cl. ..... 482/110; 482/136
(58) Field of Search ..... 482/10, 64, 66–67, 482/72, 73, 100, 101, 110, 112–119, 127, 135–138, 908

(56) References Cited

U.S. PATENT DOCUMENTS

| | | | |
|---|---|---|---|
| 1,783,376 | 12/1930 | Duff . | |
| 1,869,673 | 8/1932 | Duff . | |
| 2,472,065 | 6/1949 | Cottingham . | |
| 3,012,777 | * 12/1961 | Horas | 482/136 X |
| 3,424,005 | 1/1969 | Brown . | |
| 3,614,108 | 10/1971 | Garten . | |
| 3,738,661 | 6/1973 | Moller . | |
| 3,874,659 | 4/1975 | Aharoni . | |
| 3,926,430 | 12/1975 | Good, Jr. . | |
| 4,077,626 | 3/1978 | Newman . | |
| 4,278,249 | * 7/1981 | Forrest | 482/10 |
| 4,296,924 | 10/1981 | Anzaldua et al. . | |
| 4,305,579 | 12/1981 | Rice . | |
| 4,396,188 | 8/1983 | Dreissigacker . | |
| 4,430,902 | 2/1984 | McClure . | |
| 4,431,097 | 2/1984 | Scheer . | |
| 4,456,245 | * 6/1984 | Baldwin | 482/136 X |
| 4,470,597 | 9/1984 | McFee . | |
| 4,506,885 | 3/1985 | de Wet . | |
| 4,542,898 | 9/1985 | Grushkin . | |
| 4,625,962 | 12/1986 | Street . | |
| 4,673,177 | 6/1987 | Szymski . | |
| 4,673,180 | 6/1987 | Rice . | |

(List continued on next page.)

FOREIGN PATENT DOCUMENTS

| | | |
|---|---|---|
| 923517 | 3/1973 | (CA) . |

OTHER PUBLICATIONS

European Search Report dated May 24, 1991.

*Primary Examiner*—John Mulcahy
(74) *Attorney, Agent, or Firm*—Holland & Knight LLP

(57) ABSTRACT

An energy absorbing exercising and training machine for exercising a person's ability to accelerate a portion of his body through a path of motion. The machine comprises a flywheel rotatably connected to a frame by means of a pair of journal bearings. A harness assembly is provided for connection to the portion of the person's body to be exercised. The flywheel and the harness assembly are interconnected to allow the flywheel to rigidly engage relative to the harness assembly upon acceleration of the harness assembly relative to the flywheel in a first direction along a path of motion of the body portion being exercised and to also allow the flywheel to disengage and freely rotate relative to the harness assembly upon deceleration of the harness assembly relative to the flywheel.

81 Claims, 4 Drawing Sheets

U.S. PATENT DOCUMENTS

| | | | | |
|---|---|---|---|---|
| 4,674,741 | | 6/1987 | Pasierb, Jr. . | |
| 4,725,055 | | 2/1988 | Skowronski . | |
| 4,732,381 | | 3/1988 | Skowronski . | |
| 4,733,860 | * | 3/1988 | Steffee | 482/136 X |
| 4,765,615 | | 8/1988 | Case . | |
| 4,768,779 | | 9/1988 | Oehman, Jr. et al. . | |
| 4,773,398 | * | 9/1988 | Tatom | 482/139 X |
| 4,893,808 | | 1/1990 | McIntyre et al. . | |
| 5,004,230 | * | 4/1991 | Jones | 482/136 X |
| 5,092,584 | | 3/1992 | Jones . | |
| 5,104,364 | | 4/1992 | Jones . | |
| 5,118,098 | | 6/1992 | Jones . | |

* cited by examiner

ENERGY ABSORBING EXERCISING AND TRAINING MACHINE

Matter enclosed in heavy brackets [ ] appears in the original patent but forms no part of this reissue specification; matter printed in italics indicates the additions made by reissue.

[This is a continuation of copending application Ser. No. 07/388,116 filed on 08/01/89, now abandoned.]*This is a continuation of application Ser. No. 08/126,301 filed Sep. 23, 1993, now abandoned, which is a reissue of 07/607,641 filed Oct. 25, 1990, U.S. Pat. No. 5,050,871, which is a continuation of application Ser. No. 07/308,116 filed Aug. 1, 1989, now abandoned.*

BACKGROUND OF THE INVENTION

1. Field of the Invention

This invention relates to exercising and training machines. More particularly, this invention relates to exercising and training machines for exercising a person's ability to accelerate a portion of his body through a path of motion, such as which occurs during a baseball or golf swing.

2. Description of the Background Art

Presently there exists many types of exercising and training machines designed to exercise portions of a person's body. The most predominant type of exercising and training machine utilizes weight resistance which, through repetition, builds the person's muscles. Unfortunately, there exists a need for an exercise and training machine which exercises a person's ability to accelerate a portion of his body through a path of motion, such as what occurs during the swinging of a baseball bat or a golf club. There also exists a need for an exercising and training machine which isolates individual muscle groups and measures acceleration of a portion of a person's body. Indeed, many professional athletes such as golfers and baseball players refrain from resistance weight training during season in fear of adversely affecting their flexibility and ability t swing their golf club or baseball bat in a controlled manner.

Therefore, it is an object of this invention to provide an apparatus which overcomes the aforementioned inadequacies of the prior art devices and provides an improvement which is a significant contribution to the advancement of the exercising art.

Another object of this invention is to provide an exercising and training machine which exercises and trains a person's ability to accelerate a portion of his body through a path of motion.

Another object of this invention is to provide an exercising and training machine which is to be utilized by golfer's in exercising their golf swing.

Another object of this invention is to provide an exercising and training machine to be used by golfer's in exercising their backswing.

Another object of this invention is to provide an energy absorbing exercising machine which allows the user to regulate the amount of resistance in accordance with the user's physical ability and which can, therefore, be used for rehabilitation of muscles.

Another object of this invention is to provide an energy absorbing exercising and training machine which allows a person to time the release of energy at the instant of the most importance.

The foregoing has outlines some of the more pertinent objects of the invention. These objects should be construed to be merely illustrative of some of the more prominent features and applications of the intended invention. Many other beneficial results can be obtained by applying the disclosed invention in a different manner or modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

SUMMARY OF THE INVENTION

The invention is defined by the appended claims with a specific embodiment shown in the attached drawings. For the purpose of summarizing the invention, the invention comprises an energy absorbing exercising and training machine for exercising a person's ability to accelerate a portion of his body through a path of motion. The machine comprises a flywheel rotatably connected to a frame by means of a pair of journal bearings. A harness assembly is provided for connection to the portion of the person's body to be exercised. Means are provided for interconnecting the flywheel and the harness assembly allowing the flywheel to rigidly engage relative to the harness assembly upon acceleration of the harness assembly relative to the flywheel in a first direction along the path of motion of the body portion being exercised. The interconnecting means also allows the flywheel to disengage and freely rotate relative to the harness assembly upon deceleration of the harness assembly relative to the flywheel.

The body portion being exercised may therefore be forcibly accelerated in the first direction along the path of motion against the inertia of the flywheel. Upon deceleration of the body portion, the flywheel disengages relative to the harness assembly thereby precluding the inertia of the flywheel from exerting a force on the body portion along the path of motion. In the preferred embodiment, the interconnecting means comprises an over-running clutch having an inner race mounted to a shaft which is connected to the flywheel and journaled in the pair of bearings and having an outer race connected relative to the harness assembly.

The exercising and training machine of the invention may be utilized in conditioning and training for many sports and other activities that encourage the rapid acceleration of a portion of the person's body, such as occurs in baseball, golf, and other swing-type activities. The machine is also usable in exercising individual muscle groups that are customarily exercised through weight lifting exercises like bench presses, bi-ceps curls and overhead presses. The exercising and training machine is described herein as being utilized in conditioning for golf by exercising the twisting acceleration of the golfer's torso and legs during a golf swing.

Specifically, when utilized as a torso and legs exercising machine for golfers, the exercising and training machine of the invention comprises a stand which adjustably positions the flywheel, shaft, and overrunning clutch in a position above the golfer's head, with the harness assembly connected to the lower most end of the shaft by means of a universal joint, preferably a constant velocity universal joint. The harness assembly comprises an inverted substantially U-shaped or V-shaped rigid configuration for fitting over the shoulders and upper torso of the golfer's body. The universal joint allows the torso harness assembly to universally pivot during the golf swing.

Preferably, the frame comprises a carriaged frame that is operatively connected to the stand by means of slide bearings which allow the frame, flywheel, shaft and torso harness assembly to freely reciprocate sideways above the golfer's head, the sideways movement being geared to the rotation of the torso harness of the shaft. Furthermore, the shaft is preferably sliceable journaled within the pair of journal bearings and the inner race of the over-running clutch to allow the shaft to easily reciprocate vertically. The sideways movement of the carriaged frame, the vertical movement of the shaft, and the pivoting of the torso harness assembly via the universal joint allows the golfer to exercise and be trained in a recommended golf swing which requires canting and vertical and sideways movement of the golfer's torso during the backswing and through the golf swing.

It should be appreciated that during the gold swing, the golfer'torso may accelerate to his fullest ability and the energy created thereby forces the flywheel into accelerating rotational movement and such energy is absorbed. When the golfer's torso begins to decelerate at the end of the golf swing, the overrunning clutch disengages the shaft allowing the flywheel to freely rotate. Thus, the inertia of the rotating flywheel does not exert a force on the golfer's torso once the golers's torso begins to decelerate or stop. Over-twisting and possible physical damage is therefore precluded.

When the exercising and training machine of the invention is adapted to be utilized as a golf exercising and training machine, it may additionally include means for providing resistance to the golfer's torso during the backswing and partial extension of the torso at the end of the backswing immediately prior to beginning the golf swing. More particularly, such means may comprise a cammed clutch for interconnecting the flywheel and the shaft. The cammed clutch allows the flywheel to rigidly engage the shaft only during a predefined arc of rotation which corresponds to the arcuate path of motion of the backswing. Thus, during the predefined arc of rotation, the flywheel is rigidly connected relative to the harness and provides inertial resistance to the golfer's torso during the backswing. Toward the end of the backswing, the inertia of the flywheel forces slight extension of the golfer's torso immediately prior to the golfer exerting energy by twisting his torso in the opposite direction corresponding to a golf swing thereby overcoming the inertia of the flywheel and reversing its direction. Alternatively, the cammed clutch may be adjusted to disengage the flywheel from the shaft at a predefined end of the backswing to preclude overextension of the golfer's torso and possible physical damage.

Finally, a transducer may be operatively connected to the frame to sense the rotational speed of the flywheel over time, which information is then fed into a displayed device to inform the golfer of his progressive ability to accelerate the flywheel. Additional transducers may also be operatively connected to the frame to sense the vertical movement of the shaft, the sideways shifting of the frame and the angular position of the torso harness assembly relative to the shaft. All of such information may then supplied to a computer and analyzed to determine the quality of the golf swing.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be had to the following detailed description taken in connection with the accompanying drawings in which.

Similar reference characters refer to similar parts throughout the several views of the drawings.

DETAILED DESCRIPTION OF THE PREFERRED EMBODIMENT

Figure 1:
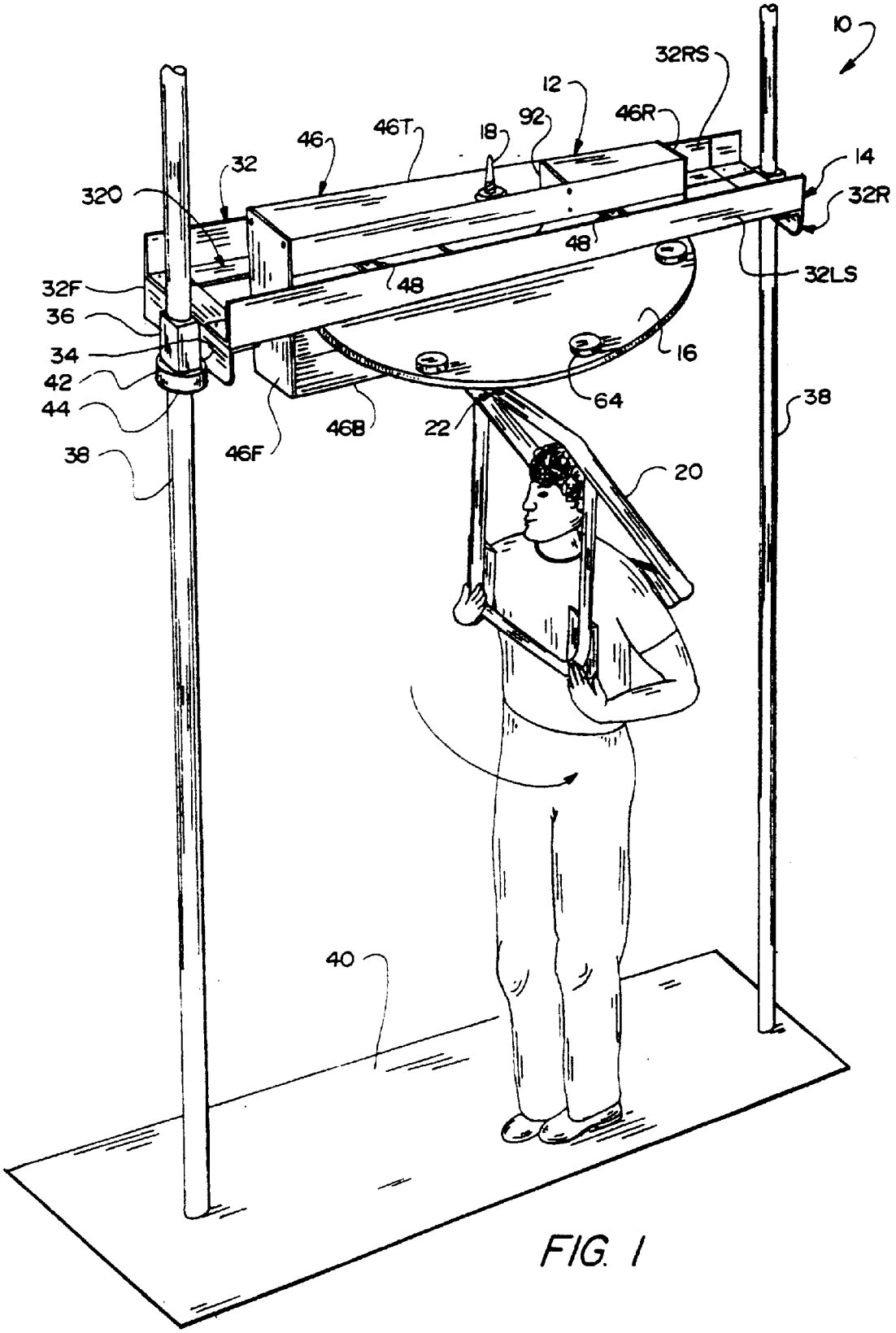
FIG. 1 is a perspective view of the exercising and training machine of the invention illustrating the carriaged frame reciprocatably mounted to a vertically adjustable stand and illustrating the flywheel rotatably journalled to the carriaged frame by means of a shaft with a torso harness assembly depending therebelow for exercising the torso and legs of a golfer.

Referring to FIG. 1, the exercising and training machine 10 of the invention comprises a carriaged frame 12 reciprocatably mounted within a vertically adjustable stand, generally indicated by numeral 14. A flywheel 16 is rotatably mounted to the carriaged frame 12 by means of a shaft 18. A torso harness assembly 20 is pivotably connected to the lowermost end of the shaft 18 by means of a universal joint 22. The torso harness assembly 20 is configured to fit over a golfer's shoulders and onto his torso as shown in the phantom in FIG. 1. As described below in greater detail, the exercising and training machine 10 exercises and trains the golfer's ability to accelerate his torso through a twisting path of motion in a first direction corresponding to proper golf swing. As also described below in greater detail, the exercising and training machine 10 of the invention also allows the golfer to forcibly move his torso in a second direction opposite to that of the first direction corresponding to a backstroke and further allows extension of the golfer's torso at the end of the golf swing.

Figures 2, 5:
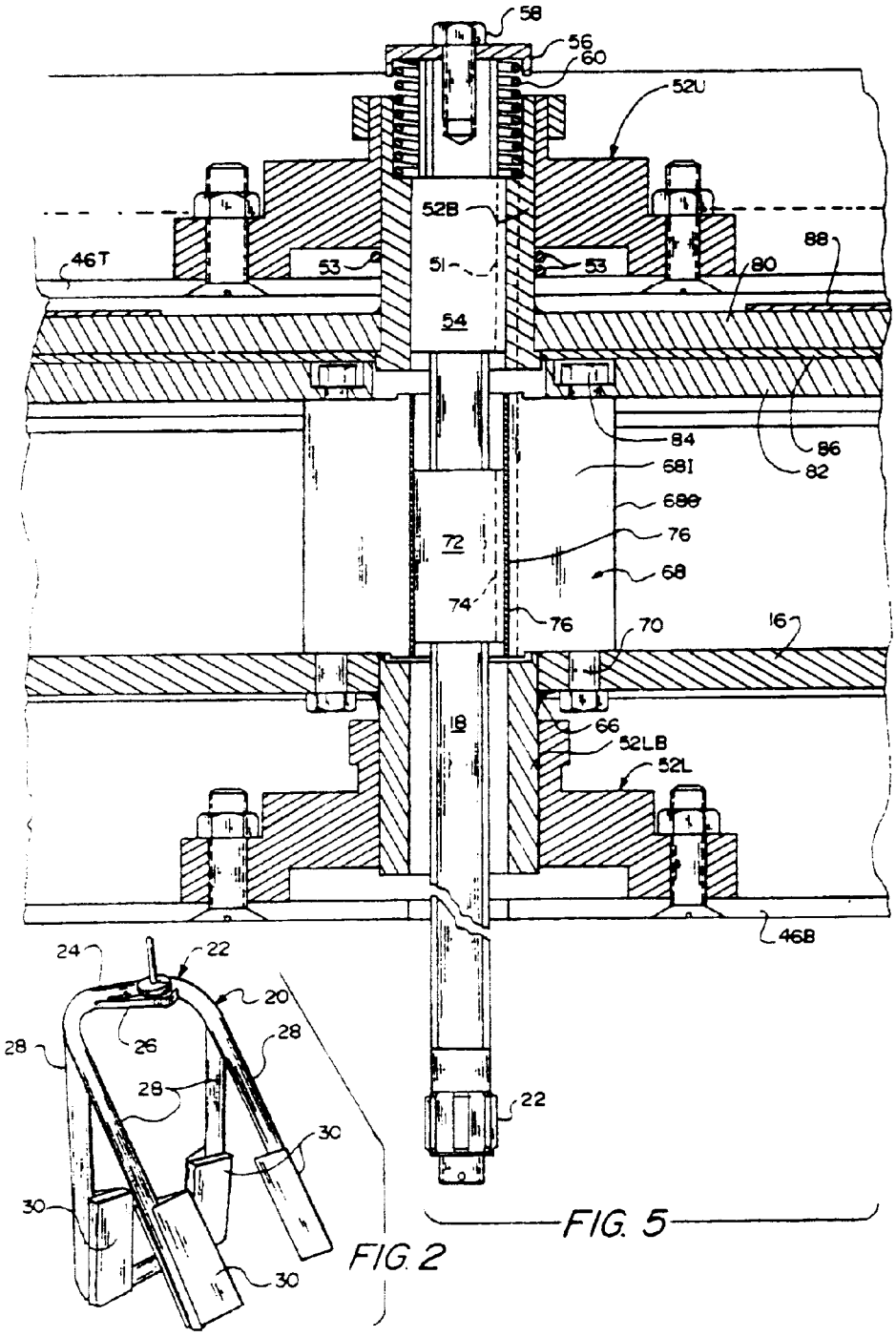
FIG. 2 is a rearward perspective view of the torso harness assembly illustrating the inverted substantially V-shaped configuration thereof and the universal joint which interconnects the torso harness assembly with the lowermost end of the shaft.
FIG. 5 is an enlarged cross-sectional view of the over-running clutch, cammed clutch and upper and lower journal bearings.

As shown in FIG. 2, the torso harness assembly 20 comprises a horizontal member 24 having a substantially horizontal bracket 26 welded thereto and inverted, substantially V-shaped arms 28 extending downwardly from opposing ends thereof. The universal joint 22 is rigidly secured to the bracket 26 by means of threaded fasteners or the like. Inwardly extending pad members 30 are rigidly connected to the arms 28.

As shown in FIG. 1, the inverted V-shaped arms 28 straddle the golfer's head and slide over the golfer's shoulders onto his torso; the horizontal member 24 being positioned sufficiently above the golfer's head so as to not interfere therewith. As thus configured, the golfer's torso is firmly seated within the torso harness assembly 20 and any rotational or other movement of the torso is transferred to the shaft 18 via universal joint 22. Preferably, universal joint 22 comprises a constant velocity universal joint.

Figure 3:
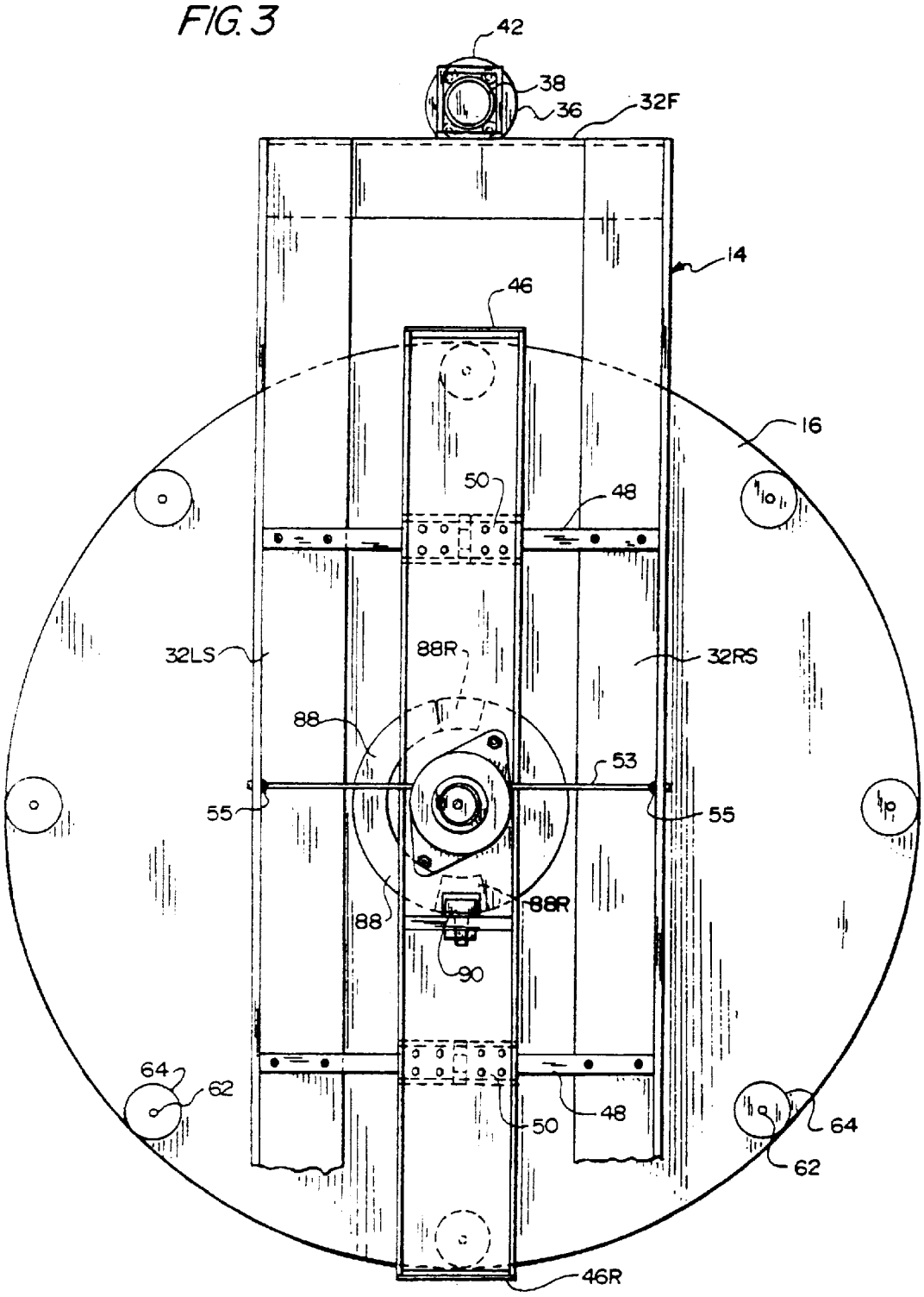
FIG. 3 is a top view of the exercising and training machine of the invention.
Figure 4:
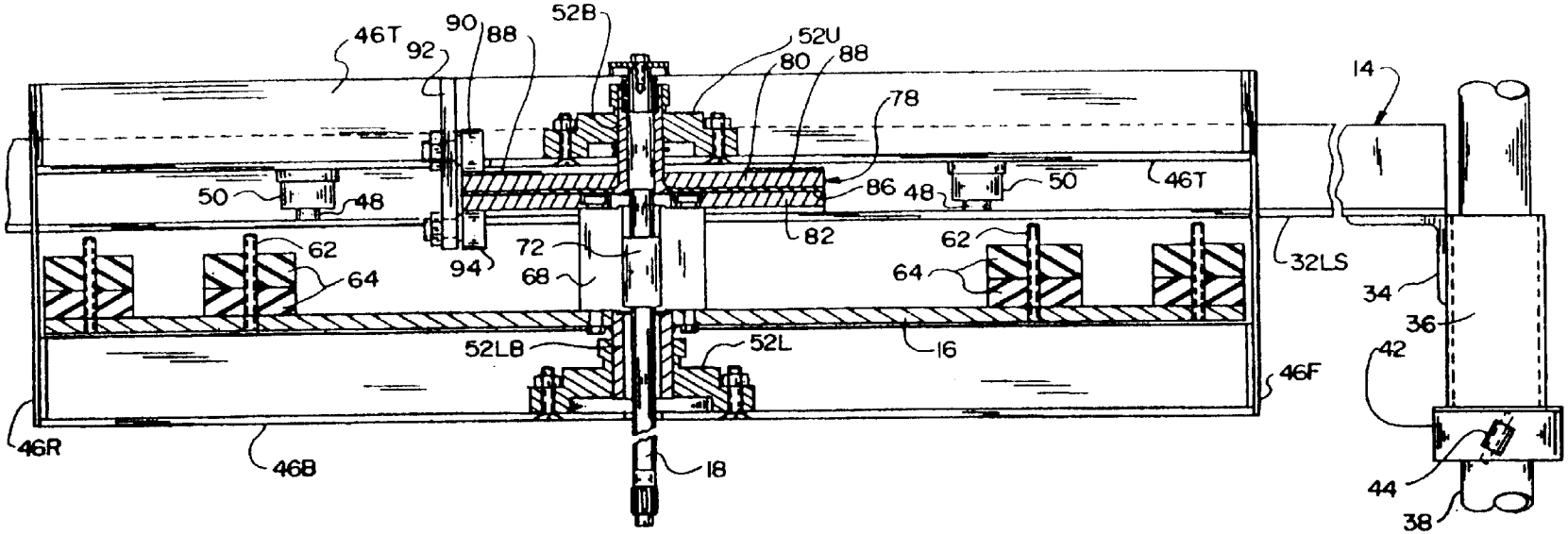
FIG. 4 is a cross-sectional view of FIG. 3 along lines 4—4 illustrating the over-running clutch which interconnects the flywheel to the shaft for rigid engagement therewith in a first direction corresponding to the golf swing and which illustrates the cammed clutch which rigidly interconnects the flywheel to the shaft during the backswing.

Referring to FIGS. 3 and 4, stand 14 comprises a generally rectangular framework having front, rear and left and right side members 32F, 32R, 32LS and 32RS, respectively, rigidly connected together to define a generally rectangular configuration having an opened center 320. A bracket 34 extends from the front 32F and rear 32R frame members for rigid connection to respective cylindrical support guides or collars 36. Each support guide 36 is slideably fitted over an upstanding cylindrical support tube or pipe 38. The tubes 38 are rigidly secured in their upright position to a ground platform 40 (see FIG. 1).

The rectangular framework 32 is vertically adjustable along the length of the tubes 38. Specifically, vertical adjustment is provided by means of rotatable lifting rings 42 positioned about the respective tubes 38, each of which include a plurality of off-axis roller bearing 44 which causes the lifting ring 42 to ascend the tube 38 when rotated in one direction and descend the tube 38 when rotated in the other direction. Thus, the height of the rectangular framework 32 may be easily adjusted by rotation of the lifting ring 42 on each tube 38.

The carriaged frame 12 comprises a generally rectangular framework 46 oriented vertically and having top and bottom frame members 46T and 46B and front and rear frame members 46F and 46R rigidly connected together a their respective corners to define a substantially rectangular configuration. The rectangular framework 46 of the carriaged frame is dimensioned to fit within the opening 320 defined by the rectangular framework 32 of the stand 14.

The rectangular framework 46 of the carriaged frame 12 is supported by the rectangular framework 32 of the stand 14 by means of a pair of rails 48 which are rigidly secured t left and side frame members 32LS and 32RS of the framework 32 of the stand 42 to span the central opening 320 thereof. Slide bearings 50 are rigidly connected to the underside of the top frame member 46T of the rectangular framework 46 of the carriaged frame 12 for slideable engagement with rails 48, thereby allowing the carriaged frame 12 to reciprocate sideways within the opening of the rectangular framework 32 of the stand 14. *The slide bearings 51 of the carriaged frame assembly 12 facilitates mounting of the carriaged framework 12 relative to the fixed framework 14 to allow translational movement of the harness assembly 20 and the rotatable shaft 18 during exercising and to preclude fixed coupling of the harness assembly 20 and the rotatable shaft 18 relative to the fixed framework 14 during exercising.*

As shown in FIG. 5, the shaft 18 is rotatably journalled to the carriaged frame 12 by means of a pair of journal bearings 52 connected to the top and bottom frame members 46T and 46B of the rectangular framework 46. Preferably, shaft 18 comprises a spline shaft and the upper journal bearing 42 includes a sleeve 52B and a ball spline bearing 54 with keyway 51 which allows the shaft 18 to reciprocate vertically relative to the journal bearing 52U and rotate. A stop 56 is connected to the upper end of the shaft 14 by means of threaded fastener 58. Spring 60 is positioned between stop 56 and the sleeve 52B for cushing.

Preferably, the sideways movement of the carriaged frame 12 is geared to the rotation of the shaft 18 by means of a cable 53 which is wrapped once around the sleeve 52B and the trailing ends 55 of the cable 53 are rigidly connected to the left and right side members 32LS and 32RS of the rectangular framework 32. Thus, it can be appreciated that rotation of the harness assembly 20, shaft 18 and sleeve 52B causes the carriaged frame 12 to travel sideways along the length of the cable 53. Preferably, the cable 53 is wrapped about the sleeve 52B in such a manner that the carriaged frame 12 is in its fully rightward position when the harness assembly 20 is rotated to a position corresponding to the start of the golfer's swing. Thus, as the golfer takes his golf swing, the carriaged frame 12 is forceably moved leftward in synchronism to the rotation of the golfer's torso, thereby training the golfer to exercise a proper golf swing.

The flywheel 16 comprises a generally disk-shaped configuration (see FIG. 3). A plurality of upstanding pins 62 are positioned equidistantly about an outer periphery of the flywheel 16 for receiving removable weights 64 to attain a flywheel having a desired mass.

The flywheel 16 is rigidly connected to the upper protruding portion of the lower sleeve bushing 52LB by means of welding 66 or the like. The flywheel 16 is operatively connected to the shaft 18 by means of an over-running clutch 68 having an outer raceway 680 rigidly connected at a lower surface to the flywheel 16 by means of threaded fasteners 70. A ball spline bearing 72 is positioned within the inner raceway 68I of the clutch 68 and is keyed thereto by means of keyway 74. Ball spline bearing 72 allows vertical movement of the shaft 18 therethrough while nonrotatably securing the inner raceway 68I to the shaft 18. A shim bushing 76 may be interposed between the inner raceway 68I and the spline bearing 72.

Rotation of shaft 18 in one direction causes the inner raceway 68I to rigidly engage the outer raceway 680 of the clutch 68 thereby rigidly interconnecting the flywheel 16 to the shaft 18. Deceleration of the shaft 18 relative to the flywheel 16 causes the raceway 680 and 68I to disengage allowing the flywheel 16 to freely over-run without exerting any torque on the shaft 18. Thus, with the torso harness assembly 20 connected to the end of the shaft 18, it can be readily appreciated that the golfer's twisting of his torso during the golf swing will forcibly accelerate the flywheel 16 and, at the end of the golf swing when the torso begins to decelerate, the flywheel 16 freely overruns to prevent any force being imparted to the torso harness assembly 20 which would otherwise adversely affect the golf swing and possibly cause physical damage to the golfer.

The exercising and training machine 10 of the invention further includes a cammed clutch, generally indicated by numeral 78, which interconnects the flywheel 16 and the shaft 18 and allows the flywheel 16 to rigidly engage the shaft 18 during a predefined arc of rotation of the shaft in a second direction corresponding to the golfer's backswing opposite to the first direction corresponding to the golfer's golf swing.

More particularly, the cammed clutch 78 comprises a first clutch plate 80 which is rigidly connected to the upper sleeve bushing 52LB of the upper journal bearing 52. The cammed clutch 78 further comprises a second clutch plate 82 positioned in alignment with the first clutch plate 80 and rigidly connected to the upper surface of the outer raceway 680 of the over-running clutch 68 by means of threaded fastener 84. A wearable clutch 86 is positioned between the clutch plates 80 and 82. An arcuate cam 88 is rigidly connected to the upper surface of the first clutch plate 80 and includes end ramp 88R. A corresponding cam roller 90 is rotatably connected to a bracket 92 depending from the top frame member 46T of the rectangular framework 46 in alignment with cam 88. A lower cam roller 94 may also be rotatably connected to bracket 92 for support to the underside of the second clutch plate 82.

The cam 88 is arcuately shaped to be engaged by the cam roller 90 along the predefined arc of rotation which corresponds to the backswing of the golfer when the golfer is facing forwardly. Thus, as the golfer begins his backswing, cam roller 90 engages cam 88 to frictionally engage the clutch plates 80 and 82 together and rigidly interconnecting the flywheel 16 to the shaft 18 via sleeve 52B and ball spline bearing 54. The golfer must thus exert enough backswing force to rotate flywheel 16. At the end of the golfer's backswing, cam roller 90 rolls off ramp 88R of cam 88 thereby disengaging the plates 80 and 82 and allowing flywheel 16 to freely rotate. The relative positioning of ramp 88R of cam 88 determines when the flywheel 68 is disengaged. Thus, it cam be appreciated that a certain amount of extension of the golfer's torso can be achieved by proper positioning of the cam ramp 88R relative to the golfer's backswing.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit of the invention.

Now that the invention has been described. What is claimed is:

1. An exercising and training machine for exercising a person's ability to accelerate a portion of the person's body through a non-continuous path of motion, comprising in combination:

flywheel characterized as having a large amount of inertia;

frame;

bearing means for rotatably connecting said flywheel relative to said frame allowing said flywheel to freely rotate in both directions relative to said frame;

harness assembly for connection to the portion of the person's body to be exercised;

means for interconnecting said flywheel and said harness assembly allowing said flywheel to rigidly engage relative to said harness assembly upon acceleration of said harness assembly relative to said flywheel in a first direction along the path of motion of the body portion being exercised and against only the inertia of said flywheel and to disengage and freely rotate relative to said harness assembly upon deceleration of said harness assembly relative to said flywheel such that the body portion being exercised may be accelerated in said first direction along the path of motion against only the inertia of said flywheel and upon deceleration of the body portion, said flywheel disengages relative to said harness assembly thereby precluding said flywheel from exerting a force on the body portion along the path of motion.

2. The exercising and training machine as set forth in claim 1, wherein said interconnecting means comprises an over-running clutch having an outer race connected to said flywheel and having an inner race connected relative to said harness assembly and wherein said bearing means comprises a journal bearing mounted to said frame through which a shaft is rotatably journalled.

3. The exercising and training machine as set forth in claim 2, wherein said interconnecting means further comprises a universal joint interconnecting said shaft and said harness assembly.

4. The exercising and training machine as set forth in claim 3, wherein said universal joint comprises a constant velocity universal joint.

5. The exercising and training machine as set forth in claim 2, wherein said journal bearing comprises means for reciprocatably connecting said shaft relative to said frame and wherein said inner race of said over-running clutch comprises means for reciprocatably mounting said shaft therethrough, whereby said shaft may reciprocate relative to said frame and said flywheel.

6. The exercising and training machine as set forth in claim 5, further including a spring-loaded stop connected to said shaft to prevent said shaft from sliding out of said journal bearing and said inner race of said over-running clutch when the exercising and training machine is utilized with said shaft positioned vertically and said harness assembly depending therebelow.

7. The exercising and training machine as set forth in claim 2, further including a cammed clutch interconnecting said flywheel and said shaft allowing said flywheel to rigidly engage said shaft during a predefined arc of rotation of said shaft in a second direction opposite to said first direction.

8. The exercising and training machine as set forth in claim 7, wherein said cammed clutch comprises:

a first clutch plate;

means for non-rotatably, reciprocatably mounting said first clutch plate to said shaft;

a second clutch plate;

means for rigidly connecting said second clutch plate relative to said flywheel;

cam roller rotatably mounted relative to said frame; and cam mounted to said first clutch plate for engagement by said cam roller during said predefined arc of rotation, whereby said first clutch plate is cammed into frictional engagement with said second clutch plate when said cam roller engages said cam thereby interconnecting said shaft and said flywheel during said predefined arc of rotation.

9. The exercising and training machine as set forth in claim 8, wherein said cammed clutch further comprises a wearable clutch positioned between said first clutch plate and said second clutch plate.

10. The exercising and training machine as set forth in claim 2, wherein said shaft is positioned vertically relative to said frame with said harness assembly depending therebelow and wherein said frame is adjustably elevated by means of a stand, thereby allowing adjustment of the height of said harness assembly.

11. The exercising and training machine as set forth in claim 10, wherein the body portion being exercised comprises a torso and wherein said harness assembly comprises a torso harness assembly.

12. The exercising and training machine as set forth in claim 11, wherein said torso harness assembly comprises are inverted substantially V-shaped configuration for fitting over the shoulders and onto the upper torso of the person's body.

13. The exercising and training machine as set forth in claim 2, wherein said shaft is positioned vertically relative to said frame with said harness assembly depending therebelow and wherein said frame comprises a carriaged frame horizontally and reciprocatably mounted relative to an upstanding stand allowing said carriaged frame to horizontally reciprocate.

14. The exercising and training machine as set forth in claim 13, the body portion being exercised comprises a torso and wherein said harness assembly comprises a torso harness assembly.

15. The exercising and training machine as set forth in claim 14, wherein said torso harness assembly comprises an inverted substantially V-shaped configuration for fitting over the shoulders and onto the upper torso of the person's body.

16. The exercising and training machine as set forth in claim 13, further including means for moving and carriaged frame sideways as said shaft is rotated.

17. The exercising and training machine as set forth in claim 16, wherein said moving means comprises a flexible member connected relative to said shaft and whose trailing ends are rigidly connected to opposing sides of said upstanding stand such that rotation of said shaft in one direction moves said carriaged frame in one sideways direction and rotation of said shaft in the other direction moves said carriaged frame in the other sideways direction.

18. An exercising and training machine for exercising a person's ability to accelerate a portion of the person's body through a non-continuous path of motion, comprising in combination:

shaft;

flywheel characterized as having a large movement of inertia;

frame;

bearing means for rotatably connecting said flywheel relative to said frame, said bearing means comprising a journal bearing mounted to said frame through which said shaft is rotatably journalled;

harness assembly for connection to the portion of the person's body to be exercised;

a universal join interconnecting said shaft and said harness assembly; and over-running clutch having an outer race connected to said flywheel and having an inner race connected relative to said shaft allowing said flywheel to rigidly engage relative to said harness assembly upon acceleration of said harness assembly relative to said flywheel in a first direction along the path of motion of the body portion being exercised and to disengage and freely rotate relative to said harness assembly upon deceleration of said harness assembly relative to said flywheel such that the body portion being exercised may be accelerated in said first direction along the path of motion and upon deceleration of the body portion, said flywheel disengages relative to said harness assembly thereby precluding of said flywheel from exerting a force on the body portion along the path of motion.

19. The exercising and training machine as set forth in claim 18, wherein said universal joint comprises a constant velocity universal joint.

20. The exercising and training machine as set forth in claim 18, wherein said journal bearing comprises means for reciprocatably connecting said shaft relative to said frame and wherein said inner race of said over-running clutch comprises means for reciprocatably mounting said shaft therethrough, whereby said shaft may reciprocate relative to said frame and said flywheel.

21. The exercising and training machine as set forth in claim 20, further including a spring-loaded stop connected to said shaft to prevent said shaft from sliding out of said journal bearing and said inner race of said over-running clutch when the exercising and training machine is utilized with said shaft positioned vertically and said harness assembly depending therebelow.

22. The exercising and training machine as set forth in claim 18, further including a cammed clutch interconnecting said flywheel and said shaft allowing said flywheel to rigidly engage said shaft during a predefined arc of rotation of said shaft in a second direction opposite to said first direction.

23. The exercising and training machine as set forth in claim 22, wherein said cammed clutch comprises:

a first clutch plate;

means for non-rotatably, reciprocatably mounting said first clutch plate to said shaft;

a second clutch plate;

means for rigidly connecting said second clutch plate relative to said flywheel;

cam roller rotatably mounted relative to said frame; and cam mounted to said first clutch plate for engagement by said cam roller during said predefined arc of rotation, whereby said first clutch plate is cammed into frictional engagement with said second clutch plate when said cam roller engages said cam thereby interconnecting said shaft and said flywheel during said predefined arc of rotation.

24. The exercising and training machine as set forth in claim 18, wherein said shaft is positioned vertically relative to said frame with said harness assembly depending therebelow and wherein said frame is adjustably elevated by means of a stand, thereby allowing adjustment of the height of said harness assembly.

25. The exercising and training machine as set forth in claim 24, wherein the body portion being exercised comprises a torso and wherein said harness assembly comprises a torso harness assembly.

26. The exercising and training machine as set forth in claim 25, wherein said torso harness assembly comprises an inverted substantially V-shaped configuration for fitting over the shoulders and onto the upper torso of the person's body.

27. The exercising and training machine as set forth in claim 18, wherein said shaft is positioned vertically relative to said frame with said harness assembly depending therebelow and wherein said frame comprises a carriaged frame horizontally and reciprocatably mounted relative to an upstanding stand allowing said carriaged frame to horizontally reciprocate.

28. The exercising and training machine as set forth in claim 27, the body portion being exercised comprises a torso and wherein said harness assembly comprises a torso harness assembly.

29. The exercising and training machine as set forth in claim 28, wherein said torso harness assembly comprises an inverted substantially V-shaped configuration for fitting over the shoulders and onto the upper torso of the person's body.

30. The exercising and training machine as set forth in claim 29 further including means for moving and carriage frame sideways as said shaft is rotated.

31. The exercising and training machine as set forth in claim 30, wherein said moving means comprises a flexible member connected relative to said shaft and shows trailing ends are rigidly connected to opposing sides of said upstanding stand such that rotation of said shaft in one direction moves said carriaged frame in one sideways direction and rotation of said shaft in the other direction moves said carriaged frame in the other sideways direction.

*32. An exercising machine for exercising a portion of a person's body about a translationally movable axis of rotation, comprising in combination:*

*a harness for removable engagement with the portion of the person's body to be exercised, said harness comprising a torso harness;*

*a rotatable shaft;*

*means for operatively connecting said harness to said rotatable shaft to rotate therewith;*

*a carriaged frame assembly including a fixed framework and a carriaged framework;*

*means for rotatably connecting said rotatable shaft to said carriaged framework; and*

*said carriaged frame assembly comprising means for mounting said carriaged framework relative to said fixed framework to linearly and freely move as said harness and said rotatable shaft are linearly moved;*

*whereby, upon rotational exercising of the portion of the person's body about the axis of rotation of said rotatable shaft against a rotational resistance applied thereto, said carriaged framework, said harness and said rotatable shaft may linearly move relative to said fixed framework.*

*33. The exercising machine as set forth in claim 32, wherein said mounting means comprises means for mounting said carriaged framework to linearly move relative to said fixed framework substantially perpendicular to the axis of rotation of said rotatable shaft.*

*34. The exercising machine as set forth in claim 33, wherein said mounting means comprises at least one rail extending between said fixed framework and said carriaged framework on which said carriaged framework moves relative to said fixed framework, said rail extending substantially perpendicular to the axis of rotation of said rotatable shaft.*

*35. The exercising machine as set forth in claim 34, wherein said carriaged frame assembly further includes means for slidably engaging said rail to permit resistance-free linear movement of said carriaged framework relative to said fixed framework.*

*36. The exercising machine as set forth in claim 34, wherein said rail of said carriaged frame assembly extends substantially horizontally relative to said fixed framework and said carriaged framework such that said carriaged framework translationally moves substantially horizontally free of gravitational forces.*

*37. The exercising machine as set forth in claim 36, further including a stand extending substantially vertically and means for mounting said fixed framework relative to said stand.*

*38. The exercising machine as set forth in claim 37, wherein said means for mounting said fixed framework relative to said stand comprises means for adjustably vertically mounting said fixed framework relative to said stand.*

*39. The exercising machine as set forth in claim 37, wherein said axis of rotation of said rotatable shaft extends substantially vertically.*

*40. The exercising machine as set forth in claim 39, wherein said axis of rotation of said rotatable shaft extends substantially vertically beneath said carriaged frame assembly and wherein said harness is positioned beneath said carriaged frame assembly.*

*41. The exercising machine as set forth in claim 40, wherein said torso harness comprises an inverted substantially V-shaped configuration for fitting over the shoulders and the upper torso of the person's body.*

*42. The exercising machine as set forth in claim 41, wherein said resistance comprises a flywheel characterized as having a large amount of inertia.*

*43. The exercising machine as set forth in claim 42, further including means for rotatably mounting said flywheel relative to said carriaged framework.*

*44. The exercising machine as set forth in claim 43, further including an over-running clutch having an outer race connected to said flywheel and an inner race connected to said rotatable shaft allowing said flywheel to rigidly engage relative to said torso harness upon acceleration of said torso harness and to disengage relative to said torso harness upon deceleration of said torso harness.*

*45. The exercising machine as set forth in claim 44, wherein said means for rotatably mounting said flywheel relative to said carriaged framework further comprises means for reciprocatably connecting said rotatable shaft relative to said carriaged framework.*

*46. The exercising machine as set forth in claim 45, wherein said means for reciprocatably connecting said rotatable shaft relative to said carriaged framework comprises a spline bearing.*

*47. The exercising machine as set forth in claim 45, further including a spring-loaded stop connected to said rotatable shaft to prevent said rotatable shaft from sliding out of said spline bearing and to at least partially compensate for the weight of said torso harness and said rotatable shaft.*

*48. The exercising machine as set forth in claim 46, further including a clutch interconnecting said flywheel and said rotatable shaft allowing said flywheel to rigidly engage said rotatable shaft.*

*49. An exercising machine for exercising a portion of a person's body about an axis of rotation, comprising in combination:*

*a frame assembly;*

*a rotatable shaft whose axis comprises the axis of rotation;*

*a harness for removable engagement with the portion of the person's body to be exercised;*

*means for operatively connecting said harness to said rotatable shaft to rotate therewith;*

*means for rotatably connecting said rotatable shaft relative to said frame assembly allowing rotational movement of said rotatable shaft about the axis of rotation against a rotational resistance applied thereto;*

*means for reciprocatably connecting said rotatable shaft relative to said frame assembly for free reciprocable movement along the axis of said rotatable shaft;*

*whereby, upon rotational exercising of the portion of the person's body about the axis of rotation, said rotatable shaft may rotatably move against the rotational resistance and freely reciprocatably move relative to said frame assembly.*

*50. The exercising machine as set forth in claim 49, wherein said means for reciprocatably connecting said rotatable shaft relative to said frame assembly comprises a spline bearing.*

*51. The exercising machine as set forth in claim 49, further including a spring-loaded stop connected to said rotatable shaft to prevent said rotatable shaft from sliding out of said spline bearing.*

*52. The exercising machine as set forth in claim 49, wherein said frame assembly comprises a carriaged frame assembly including a fixed framework and a carriaged framework, said carriaged frame assembly comprising means for mounting said carriaged framework relative to said fixed framework to move relative to said fixed framework whereby, upon rotational exercising of the portion of*

*the person's body about the axis of rotation, said carriaged framework may move relative to said fixed framework.*

*53. The exercising machine as set forth in claim 52, wherein said mounting means comprises means for mounting said carriaged framework to move relative to said fixed framework substantially perpendicular to the axis of rotation of said rotatable shaft.*

*54. The exercising machine as set forth in claim 53, wherein said mounting means comprises at least one rail extending between said fixed framework and said carriaged framework on which said carriaged framework translationally moves, said rail extending substantially perpendicular to the axis of rotation of said rotatable shaft.*

*55. The exercising machine as set forth in claim 54, wherein said carriaged frame assembly further including means for slidably engaging said rail to permit resistance-free translational movement of said carriaged framework.*

*56. The exercising machine as set forth in claim 54, wherein said rail of said carriaged frame assembly extends substantially horizontally relative to said fixed framework and said carriaged framework such that said carriaged framework translationally moves substantially horizontally free of gravitational forces.*

*57. The exercising machine as set forth in claim 56, further including a stand extending substantially vertically and means for mounting said fixed framework relative to said stand.*

*58. The exercising machine as set forth in claim 57, wherein said means for mounting said fixed framework relative to said stand comprises means for adjustably mounting said fixed framework relative to said stand.*

*59. The exercising machine as set forth in claim 58, wherein said axis of rotation of said rotatable shaft extends substantially vertically.*

*60. The exercising machine as set forth in claim 59, wherein said axis of rotation of said rotatable shaft extends substantially vertically beneath said carriaged frame assembly and wherein said harness is positioned beneath said carriaged frame assembly.*

*61. The exercising machine as set forth in claim 60, wherein said harness comprises a torso harness.*

*62. The exercising machine as set forth in claim 61, wherein said torso harness comprises an inverted substantially V-shaped configuration adapted for fitting over the shoulders and the upper torso of the person's body.*

*63. The exercising machine as set forth in claim 62, wherein said resistance comprises a flywheel characterized as having a large amount of inertia.*

*64. The exercising machine as set forth in claim 63, further including means for rotatably mounting said flywheel relative to said carriaged framework.*

*65. The exercising machine as set forth in claim 64, further including an over-running clutch having an outer race connected to said flywheel and an inner race connected to said rotatable shaft allowing said flywheel to rigidly engage relative to said torso harness upon acceleration of said torso harness and to disengage relative to said torso harness upon deceleration of said torso harness.*

*66. An exercising machine for exercising a portion of a person's body about a translationally moveable axis of rotation, comprising in combination:*

*a rotatable shaft whose axis comprises the axis of rotation;*

*a harness for removable engagement with the portion of the person's body to be exercised;*

*means for operatively connecting said harness to said rotatable shaft to rotate therewith;*

*a carriaged frame assembly including a fixed framework and a carriaged framework, said carriaged frame assembly comprising means for mounting said carriaged framework relative to said fixed framework to allow translational movement of said harness and said rotatable shaft during exercising and to preclude fixed coupling of said harness and said rotatable shaft relative to said fixed framework during exercising;*

*means for rotatably connecting said rotatable shaft relative to said carriaged framework allowing rotational movement of said rotatable shaft about the axis of rotation against a rotational resistance; and*

*means for reciprocatably connecting said rotatable shaft relative to said frame assembly for free reciprocable movement along the axis of said rotatable shaft;*

*whereby, upon rotational exercising of the portion of the person's body about the axis of rotation, said carriaged framework, said harness assembly and said rotatable shaft may translationally move and said rotatable shaft may rotatably move against the rotational resistance and freely reciprocatably move relative to said fixed framework.*

*67. The exercising machine as set forth in claim 66, wherein said axis of rotation of said rotatable shaft extends substantially vertically.*

*68. The exercising machine as set forth in claim 67, wherein said axis of rotation of said rotatable shaft extends substantially vertically beneath said carriaged frame assembly and wherein said harness means is positioned beneath said carriaged frame assembly.*

*69. The exercising machine as set forth in claim 68, wherein said harness comprises a torso harness.*

*70. The exercising machine as set forth in claim 69, wherein said torso harness comprises an inverted substantially V-shaped configuration for fitting over the shoulders and the upper torso of the person's body.*

*71. The exercising machine as set forth in claim 70, wherein said resistance comprises a flywheel characterized as having a large amount of inertia.*

*72. The exercising machine as set forth in claim 71, further including means for rotatably mounting said flywheel relative to said carriaged framework.*

*73. The exercising machine as set forth in claim 72, further including an over-running clutch having an outer race connected to said flywheel and an inner race connected to said rotatable shaft allowing said flywheel to rigidly engage relative to said torso harness upon acceleration of said torso harness and to disengage relative to said torso harness upon deceleration of said torso harness.*

*74. An exercising machine for exercising a portion of a person's body about an axis of rotation, comprising in combination:*

*a frame assembly;*

*a stand including at least two upright cylindrical members positioned at opposing sides of said stand;*

*means for adjustably mounting said frame assembly between said cylindrical members of said stand, said mounting means comprising a rotatable lifting ring positioned on each of aid cylindrical members, said lifting rings being operable to ascend said cylindrical members when rotated in one direction and to descend said cylindrical members when rotated in another direction;*

*a rotatable shaft;*

*means for rotatably connecting said rotatable shaft relative to said frame assembly to depend downwardly therefrom;*

*a harness for removable engagement with the portion of the person's body to be exercised, said harness comprising a torso harness;*

*means for operatively connecting said harness to said rotatable shaft to rotate therewith against a rotational resistance beneath said frame assembly; and*

*whereby, the height of said frame assembly may be adjusted by selective rotation of said lifting rings so that said harness means is adjustably elevated from the ground on which said stand is positioned.*

*75. The exercising machine as set forth in claim 74, wherein said frame assembly comprises a carriaged frame assembly including a fixed framework and a carriaged framework, said carriaged frame assembly comprising means for mounting said carriaged framework relative to said fixed framework to translationally move relative to said fixed framework whereby, upon rotational exercising of the portion of the person's body about the axis of rotation, said carriaged framework may translationally move relative to said fixed framework.*

*76. An exercising machine for exercising a portion of a person's body about an axis of rotation, comprising in combination:*

*a frame assembly, said frame assembly comprising a carriaged frame assembly including a fixed framework and a carriaged framework, said carriaged frame assembly comprising means for mounting said carriaged framework relative to said fixed framework to translationally move relative to said fixed framework whereby, upon rotational exercising of the portion of the person's body about the axis of rotation, said carriaged framework may translationally move relative to said fixed framework;*

*a stand including at least two upright cylindrical members positioned at opposing sides of said stand;*

*means for adjustably mounting said frame assembly between said cylindrical members of said stand, said mounting means comprising a rotatable lifting ring positioned on each of aid cylindrical members, said lifting rings being operable to ascend said cylindrical members when rotated in one direction and to descend said cylindrical members when rotated in another direction;*

*a rotatable shaft;*

*means for rotatably connecting said rotatable shaft relative to said frame assembly to depend downwardly therefrom, said means for rotatably connecting said rotatable shaft relative to said frame assembly further comprises means for reciprocatably connecting said rotatable shaft relative to said frame assembly;*

*a harness for removable engagement with the portion of the person's body to be exercised;*

*means for operatively connecting said harness to said rotatable shaft to rotate therewith against a rotational resistance beneath said frame assembly; and*

*whereby, the height of said frame assembly may be adjusted by selective rotation of said lifting rings so that said harness means is adjustably elevated from the ground on which said stand is positioned.*

*77. The exercising machine as set forth in claim 76, wherein said means for reciprocatably connecting said rotatable shaft relative to frame assembly comprises a spline bearing.*

*78. The exercising machine as set forth in claim 77, further including a spring-loaded stop connected to said rotatable shaft to prevent said rotatable shaft from sliding out of said spline bearing and to at least partially compensate for the weight of said torso harness and said rotatable shaft.*

*79. An exercising machine for exercising the torso of a person's body about an axis of rotation, comprising in combination:*

*a frame assembly;*

*a rotatable shaft;*

*means for rotatably connecting said rotatable shaft relative to said frame assembly;*

*a torso harness for removable engagement with the torso, said torso harness comprising a front arm and a rear arm configured for adaption to the front and rear, respectively, of the torso; and*

*means for operatively connecting said torso harness to said rotatable shaft to rotate therewith, said connection means including a universal joint interconnecting said rotatable shaft and said torso harness; and*

*whereby, upon rotation of the torso, said arms engage the front and rear of the torso to rotate said rotatable shaft against a rotational resistance applied thereto.*

*80. The exercising machine as set forth in claim 79, further including a pair of said front arms and a pair of said rear arms that engage the left and right portions of the front and rear portions of the torso.*

*81. The exercising machine as set forth in claim 80, further including pad members connected to said arms.*

* * * * *